(12) United States Patent
Balin et al.

(10) Patent No.: US 12,511,419 B2
(45) Date of Patent: Dec. 30, 2025

(54) ACCESS CONTROL USING POLICY-BASED DYNAMIC CONTEXT EVALUATION

(71) Applicant: Dell Products L.P., Round Rock, TX (US)

(72) Inventors: Maxim Balin, Gan-Yavne (IL); Stav Sapir, Beer Sheba (IL); Roman Bober, Ha Darom (IL)

(73) Assignee: Dell Products L.P., Round Rock, TX (US)

( * ) Notice: Subject to any disclaimer, the term of this patent is extended or adjusted under 35 U.S.C. 154(b) by 148 days.

(21) Appl. No.: 18/334,472

(22) Filed: Jun. 14, 2023

(65) Prior Publication Data

US 2024/0419826 A1   Dec. 19, 2024

(51) Int. Cl.
*G06F 21/62* (2013.01)
*G06F 9/50* (2006.01)

(52) U.S. Cl.
CPC ........ *G06F 21/6218* (2013.01); *G06F 9/5033* (2013.01)

(58) Field of Classification Search
CPC ..... G06F 21/6218; G06F 9/5033; G06F 21/62
See application file for complete search history.

(56) References Cited

U.S. PATENT DOCUMENTS

| | | | | |
|---|---|---|---|---|
| 8,726,369 B1 * | 5/2014 | Emigh | ..................... | G06F 21/70 713/182 |
| 10,642,715 B1 * | 5/2020 | Simca | ................. | G06F 11/3612 |
| 2002/0002577 A1 * | 1/2002 | Garg | ..................... | G06F 9/4488 718/104 |
| 2005/0172335 A1 * | 8/2005 | Aday | ................. | G06Q 20/4016 713/185 |
| 2017/0116400 A1 * | 4/2017 | Takacs | ..................... | G06F 21/44 |
| 2021/0344512 A1 * | 11/2021 | Xu | ......................... | H04L 63/168 |
| 2022/0407702 A1 * | 12/2022 | Jakobsson | ................. | H04L 9/50 |
| 2024/0323034 A1 * | 9/2024 | Kumar | ................. | H04L 9/3268 |

OTHER PUBLICATIONS

"Universal Identity Control Plane for Distributed System"; https://spiffe.io/; downloaded on Jun. 12, 2023.

(Continued)

*Primary Examiner* — Quazi Farooqui
(74) *Attorney, Agent, or Firm* — Ryan, Mason & Lewis, LLP

(57) ABSTRACT

Techniques are provided for access control using policy-based dynamic context evaluation. One method comprises obtaining an access request comprising a first attestation identifier that is based on an evaluation of a first set of context attributes, associated with the request and identified by evaluating a context policy. In response to obtaining the request: a second set of context attributes for evaluating the first attestation identifier may be dynamically determined by evaluating the context policy. Values for the second set of context attributes may be obtained to generate a second attestation identifier. The first attestation identifier and the second attestation identifier may be compared and access to the resource may be controlled based on a result of the comparison. The first attestation identifier may be generated by a context attestor and the comparison may be performed by a context enforcer.

20 Claims, 6 Drawing Sheets

(56) References Cited

OTHER PUBLICATIONS

"Spire Concepts"; https://spiffe.io/docs/latest/spire-about/spire-concepts/; downloaded on Jun. 12, 2023.
"SUSE Linux Enterprise Micro 5.3"; https://documentation.suse.com/sle-micro/5.3/html/SLE-Micro-all/cha-selinux-slemicro.html; downloaded on Jun. 12, 2023.
"Security—AppAmor"; https://ubuntu.com/server/docs/security-apparmor; downloaded on Jun. 12, 2023.
"AppArmor-vs-Selinux: Comprehensive Comparison"; https://phoenixnap.com/kb/apparmor-vs-selinux; downloaded on Jun. 12, 2023.
"Context-Based & Step-Up Authentication Solutions"; https://cpl.thalesgroup.com/access-management/context-based-authentication; downloaded on Jun. 12, 2023.

* cited by examiner

ACCESS CONTROL USING POLICY-BASED DYNAMIC CONTEXT EVALUATION

BACKGROUND

Access control techniques are often employed to secure information and other resources. Role-based access control (RBAC) techniques may be employed, for example, to restrict access to such resources based on the roles of individual users within an organization. RBAC techniques typically allow users to access only the resources needed for their jobs. RBAC techniques, however, are vulnerable to various types of attacks, such as password theft and/or session hijacking.

A need exists for improved access control techniques.

SUMMARY

Illustrative embodiments of the disclosure provide techniques for access control using policy-based dynamic context evaluation. In one embodiment, a method comprises obtaining a request to access a resource, wherein the request comprises a first attestation identifier, wherein the first attestation identifier is based at least in part on an evaluation of a first plurality of context attributes associated with the request, and wherein the first plurality of context attributes associated with the request is identified by evaluating at least one context policy; and performing the following steps, in response to the obtaining the request: dynamically determining a second plurality of context attributes by evaluating the at least one context policy; obtaining values for the second plurality of context attributes; generating a second attestation identifier using the values for the second plurality of context attributes; and comparing the first attestation identifier and the second attestation identifier, wherein access to the resource is controlled based at least in part on a result of the comparison.

In some embodiments, the first attestation identifier is generated by at least one processing device of a context attestor. Prior to the obtaining the request, the at least one processing device of the context attestor may evaluate the at least one context policy to identify the first plurality of context attributes and evaluate the first plurality of context attributes to generate the first attestation identifier.

In at least one embodiment, the steps performed in response to the obtaining the request are performed by at least one processing device of a context enforcer. The at least one processing device of the context enforcer may be mutually authenticated with an entity that generated the first attestation identifier.

Illustrative embodiments can provide significant advantages relative to conventional access control techniques. For example, technical problems associated with access control are mitigated in one or more embodiments by performing a dynamic policy-based evaluation of context attributes.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for access control using policy-based dynamic context evaluation.

Figure 1:
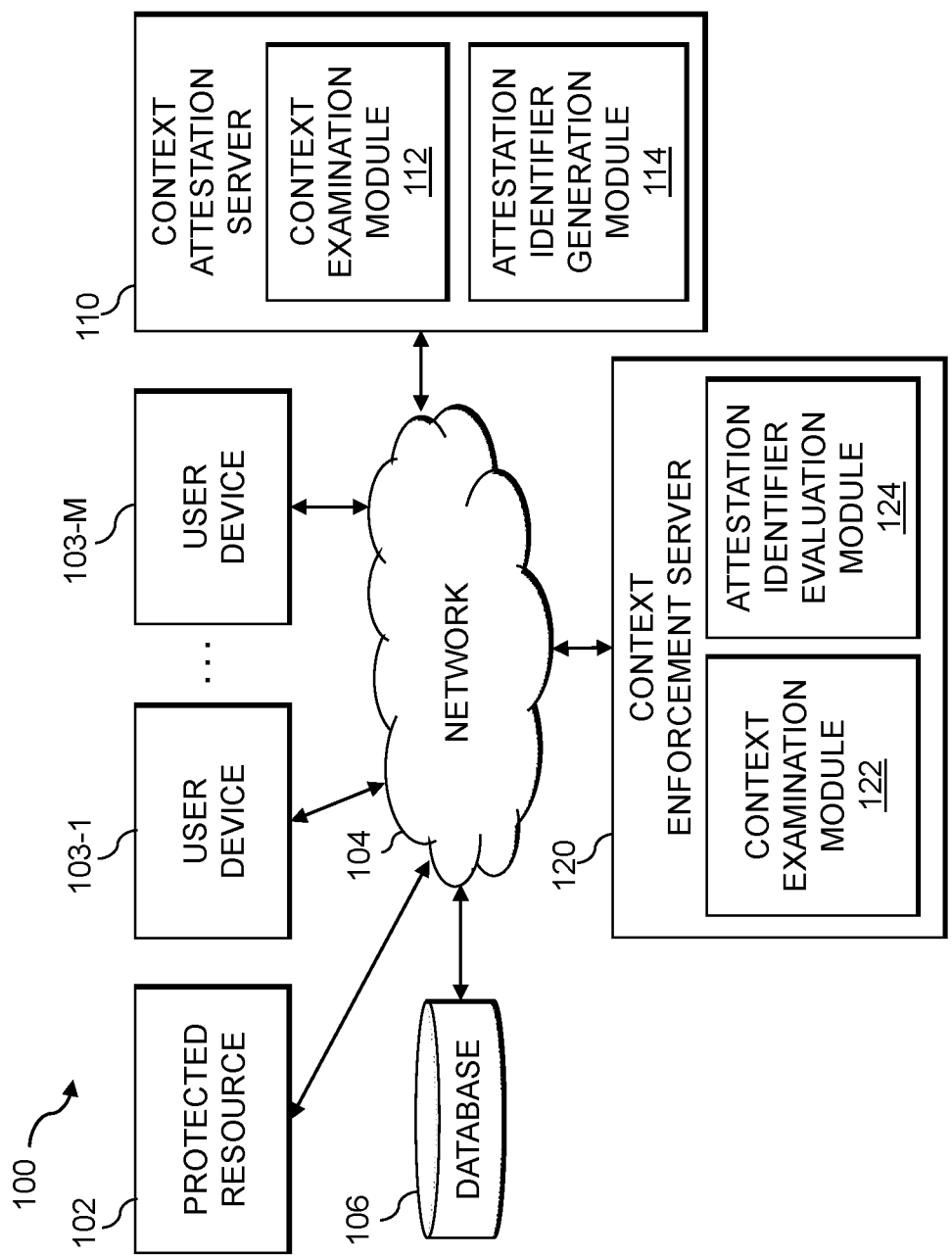
FIG. 1 illustrates an information processing system configured for access control using policy-based dynamic context evaluation in an illustrative embodiment.

FIG. 1 shows a computer network (also referred to herein as an information processing system) 100 configured in an illustrative embodiment. The computer network 100 comprises a protected resource 102 and a plurality of user devices 103-1 through 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 are one or more context attestation servers 110, one or more context enforcement servers 120 and a database 106, discussed below.

The protected resource 102 may comprise, for example, an access-controlled application, user account of a web site, process, hardware device, or another resource provided by a service provider, for example. A wide variety of other types of protected resources 102 may be utilized in other embodiments, as would be apparent to a person of ordinary skill in the art. In some embodiments, a protected resource 102 is a resource that can only be accessed following a successful authentication process, as will be described in greater detail below. For example, a protected resource 102 may include an access-controlled file, e-mail, a protected application, a remote application server such as a web site or other software program or a hardware device that is accessed over the network 104.

The user devices 103 may comprise, for example, physical computing devices such as host devices, edge devices and/or other devices such as mobile telephones, laptop computers, tablet computers, desktop computers, Internet of things (IoT) devices, or other types of computing devices. Such devices are examples of what are more generally referred to herein as "processing devices" which may be protected using the disclosed device protection techniques. Some of these processing devices are also generally referred to herein as "computers."

The context attestation servers 110 and context enforcement servers 120 may be implemented, for example, using one or more host devices.

The user devices 103, context attestation servers 110 and context enforcement servers 120 may comprise a network client that includes networking capabilities such as ethernet, Wi-Fi, etc. When the user devices 103, for example, are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary context attestation server 110 may comprise a context examination module 112 and an attestation identifier (attestID) generation module 114. In some embodiments, the context examination module 112 dynamically determines a set of context attributes using one or more context policies and obtains values for the determined set of context attributes. The attestID generation module 114 may generate an attestID using the values for the determined set of context attributes.

It is to be appreciated that this particular arrangement of the modules 112, 114 illustrated in the one or more context attestation servers 110 of the FIG. 1 embodiment is presented by way of example only, and alternative arrangements can be used in other embodiments. For example, the functionality associated with modules 112, 114 in other embodiments can be separated across a larger number of modules. As another example, multiple distinct processors can be used to implement different ones of the modules 112, 114 or portions thereof.

At least portions of modules 112, 114 may be implemented at least in part in the form of software that is stored in memory and executed by a processor. An exemplary process utilizing modules 112, 114 of the one or more context attestation servers 110 in computer network 100 will be described in more detail with reference to FIGS. 2 through 4, for example. Other context attestation servers 110 (not shown in FIG. 1) are assumed to be configured in a manner similar to that shown for context attestation server 110 in the figure.

In the example of FIG. 1, an exemplary context enforcement server 120 may comprise a context examination module 122 and an attestID evaluation module 124. In some embodiments, the context examination module 122 dynamically determines a set of context attributes, needed to evaluate a received attestID, using one or more context policies and obtains values for the determined set of context attributes. The attestID evaluation module 124 may generate an attestID using the values for the determined set of context attributes and compare the generated attestID to the received attestID to determine whether to grant access to a particular resource, such as protected resource 102.

It is to be appreciated that this particular arrangement of modules 122, 124 illustrated in the one or more context enforcement servers 120 of the FIG. 1 embodiment is presented by way of example only, and alternative arrangements can be used in other embodiments. For example, the functionality associated with modules 122, 124 in other embodiments can be separated across a larger number of modules. As another example, multiple distinct processors can be used to implement different ones of the modules 122, 124 or portions thereof.

At least portions of modules 122, 124 may be implemented at least in part in the form of software that is stored in memory and executed by a processor. An exemplary process utilizing modules 122, 124 of the one or more context enforcement servers 120 in computer network 100 will be described in more detail with reference to FIGS. 2 through 4, for example. Other context enforcement servers 120 (not shown in FIG. 1) are assumed to be configured in a manner similar to that shown for context attestation server 110 in the figure.

Additionally, the one or more context attestation servers 110 and/or the context enforcement servers 120 can have an associated database 106 configured to store, for example, user device information and/or access control policies. For example, the access control policies associated with more highly valued resources, relative to lower valued resources, may require a greater strength of an encryption algorithm, a longer encryption key length and evaluation of a greater number of context attributes using the disclosed context-based access control techniques, as discussed further below in conjunction with FIG. 2, for example. The database 106 in the present embodiment may be implemented using one or more storage systems associated with the context attestation server 110. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more context attestation servers 110, user devices 103 and/or context enforcement servers 120 may be implemented on a common processing platform, or on separate processing platforms. In some embodiments, the one or more context attestation servers 110 and one or more context enforcement servers 120 (or portions thereof) could be implemented on the same host, with a logical separation, for example. The one or more context attestation servers 110 and user devices 103, for example, may be configured to interact over the network 104 in at least some embodiments with the one or more context enforcement servers 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103 and the one or more context enforcement servers 120 to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the user devices 103, the one or more context attestation servers 110 and/or the one or more context enforcement servers 120 can be one or more input-output devices (not shown), which illustratively comprise keyboards, displays or other types of input-output devices in any combination. Such input-output devices can be used, for example, to support one or more user interfaces to the context attestation server 110, as well as to support communication between the context attestation server 110 and other related systems and devices not explicitly shown.

The user devices 103, the one or more context attestation servers 110 and/or the one or more context enforcement servers 120 in the FIG. 1 embodiment are assumed to be implemented using at least one processing device. Each such processing device generally comprises at least one processor and an associated memory and implements one or more functional modules for controlling certain features of the respective device.

More particularly, the user devices 103, the one or more context attestation servers 110 and/or the one or more context enforcement servers 120 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the user devices 103, the one or more context attestation servers 110 and/or the one or more context enforcement servers 120 to communicate in some embodiments over the network 104 with each other (as well as one or more other networked devices, not shown), and illustratively comprises one or more conventional transceivers.

It is to be understood that the particular set of elements shown in FIG. 1 for access control using policy-based dynamic context evaluation is presented by way of illustrative example only, and in other embodiments additional or alternative elements may be used. Thus, another embodiment includes additional or alternative systems, devices and other network entities, as well as different arrangements of modules and other components.

Figure 2:
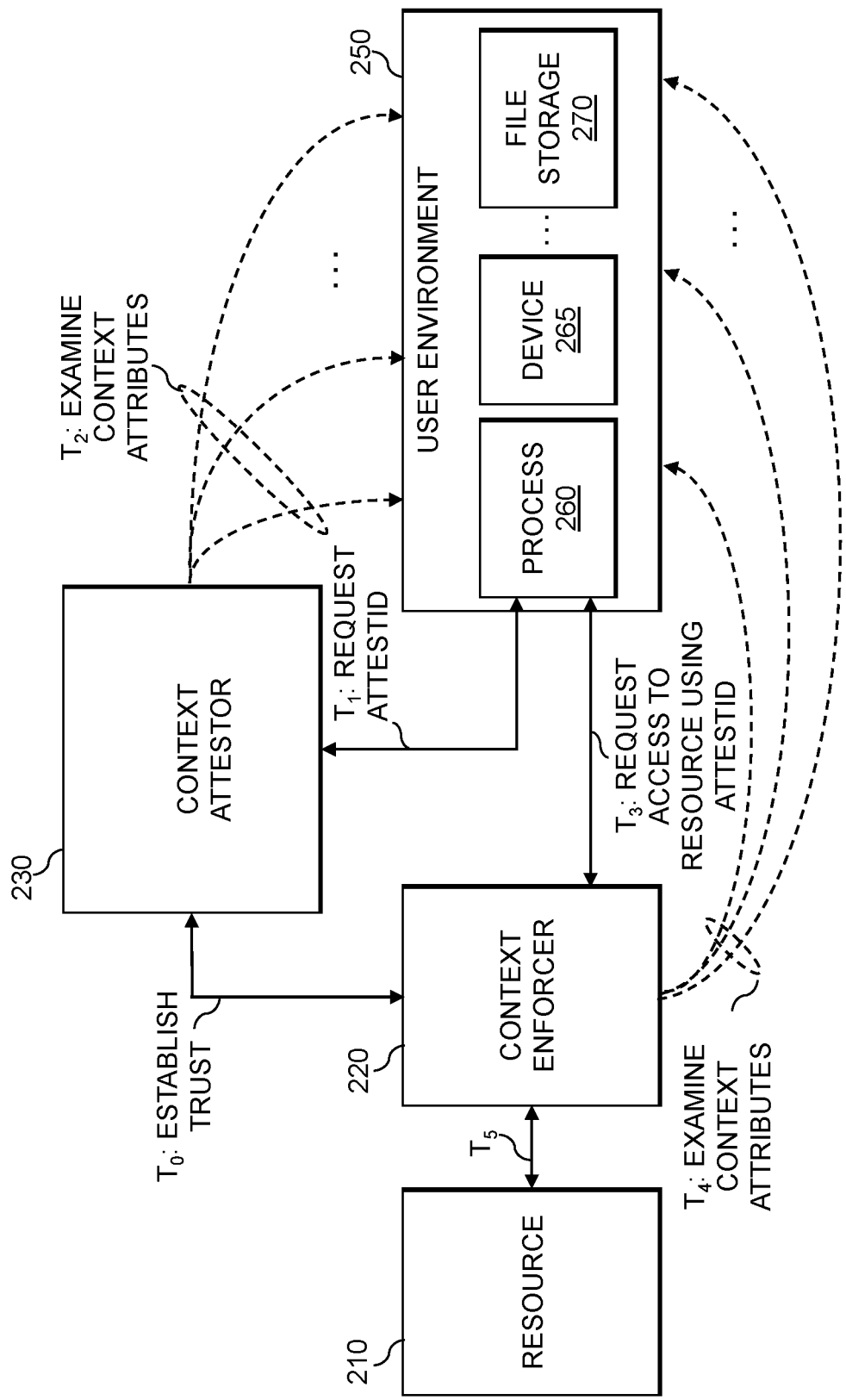
FIG. 2 illustrates a processing of an access request using the disclosed context-based access control techniques in an illustrative embodiment.

FIG. 2 illustrates a processing of an access request using the disclosed context-based access control techniques in an illustrative embodiment. In the example of FIG. 2, a process 260, in a user environment 250, desires to access a resource 210. The process 260 may be requesting access, for example, on behalf of a user, such as a user of a device 265 in the user environment 250, or independently for the process 260 itself. The process 260 obtains an attestID from a context attestor 230 and presents the obtained attestID to a context enforcer 220. The obtained attestID may allow the requesting process 260 to access only a specific resource 210 to perform one or more specified tasks.

It is assumed that the context enforcer 220 and the context attestor 230 have a preexisting trust relationship that results from a trust exchange (e.g., an mTLS (mutual Transport Layer Security) exchange or a public key infrastructure (PKI) certificate exchange) at a time $T_0$. In addition, in one or more embodiments, the context enforcer 220 and the context attestor 230 are synchronized to improve the evaluation of time-based attributes embodied in the attestID.

At a time $T_1$, the process 260 requests an attestID from the context attestor 230. The context attestor 230 examines a plurality of context attributes of the user environment 250 at a time $T_2$. In at least some embodiments, the examination at time $T_2$ comprises the context attestor 230 evaluating one or more context policies to select a set of context attributes to evaluate and obtaining values for the selected set of context attributes by interacting with the user environment 250. For example, the examined user context may comprise a globally unique identifier (GUID) and/or another unique identifier (UID) of the requesting process 260. In further variations, the one or more context attributes may comprise an executable hash of the requesting process 260, a hash of one or more docker images (or other templates for virtual resources) associated with the requesting process 260, and/or one or more configuration parameters associated with the requesting process 260 (e.g., a configuration of one or more containers that execute the requesting process 260).

In addition, the examined user context may comprise one or more attributes of the device 265 and/or at least one attribute (e.g., a file size) of one or more files stored in a file storage 270.

The context attestor 230 generates an attestID using the examined context attributes and provides the generated attestID to the requesting process 260. In some embodiments, the attestID captures the one or more desired state and/or environment attributes of the requester by examining the set of attributes defined in accordance with the one or more context policies.

At a time $T_3$, the requesting process 260 requests access from the context enforcer 220 to the resource 210 using the received attestID. The context enforcer 220 examines a plurality of context attributes of the user environment 250 at a time $T_4$. In at least some embodiments, the examination at time $T_4$ comprises the context enforcer 220 independently evaluating the same one or more context policies (evaluated at time $T_2$) to select a set of context attributes to evaluate and obtaining values for the selected set of context attributes by interacting with the user environment 250. The context enforcer 220 generates an attestID using the examined context attributes and compares the generated attestID to the attestID received at time $T_4$. In some embodiments, the context enforcer 220 evaluates a creation timestamp, an expiration timestamp and/or a cryptographic signature embodied in the received attestID to further enhance security. The creation timestamp may be defined for a future time and the context enforcer 220 should only grant access at the specified future time or later. The expiration timestamp indicates a time period for which a given attestID is valid.

The context enforcer 220 selectively grants access to the requesting process 260 at time $T_5$, based at least in part on a result of the comparison between the attestID generated at time $T_4$ and the attestID received at time $T_3$.

Figure 3:
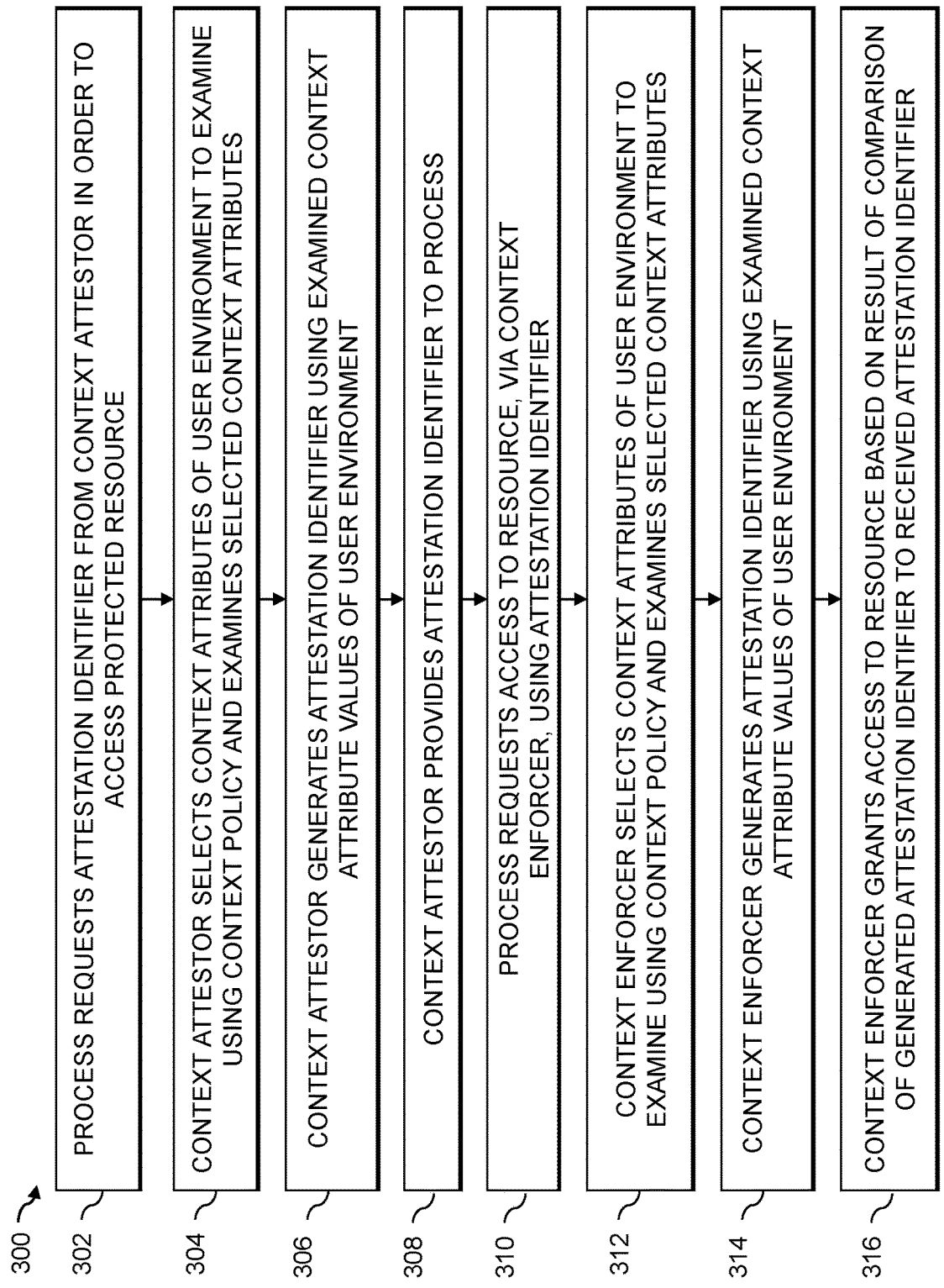
FIG. 3 is a flow chart illustrating an exemplary implementation of a process using the disclosed context-based access control techniques in an illustrative embodiment.

FIG. 3 is a flow chart illustrating an exemplary implementation of a context-based access control process 300 in an illustrative embodiment. In the example of FIG. 3, a process requests an attestID from a context attestor (e.g., the context attestation server 110) in step 302 in order to access a protected resource, such as protected resource 102.

In step 304 the context attestor (i) selects a plurality of context attributes of a user environment associated with the requesting process to examine using a context policy and (ii) examines (e.g., evaluates) the selected context attributes to obtain corresponding values. The context attestor generates an attestID in step 306 using the examined context attribute values of the user environment.

The context attestor provides the attestID to the requesting process in step 308, and the process requests access to a particular resource, via a context enforcer (e.g., the context enforcement server 120), in step 310 using the attestID.

In step 312, the context enforcer (i) selects a plurality of context attributes of the user environment to examine using the same context policy used in step 304 and (ii) examines the selected context attributes to obtain corresponding values.

The context enforcer generates an attestID in step 314 using the examined context attribute values of the user environment. In step 316, the context enforcer grants access to the particular resource based at least in part on a result of a comparison of the generated attestID and the received attestID.

Figure 4:
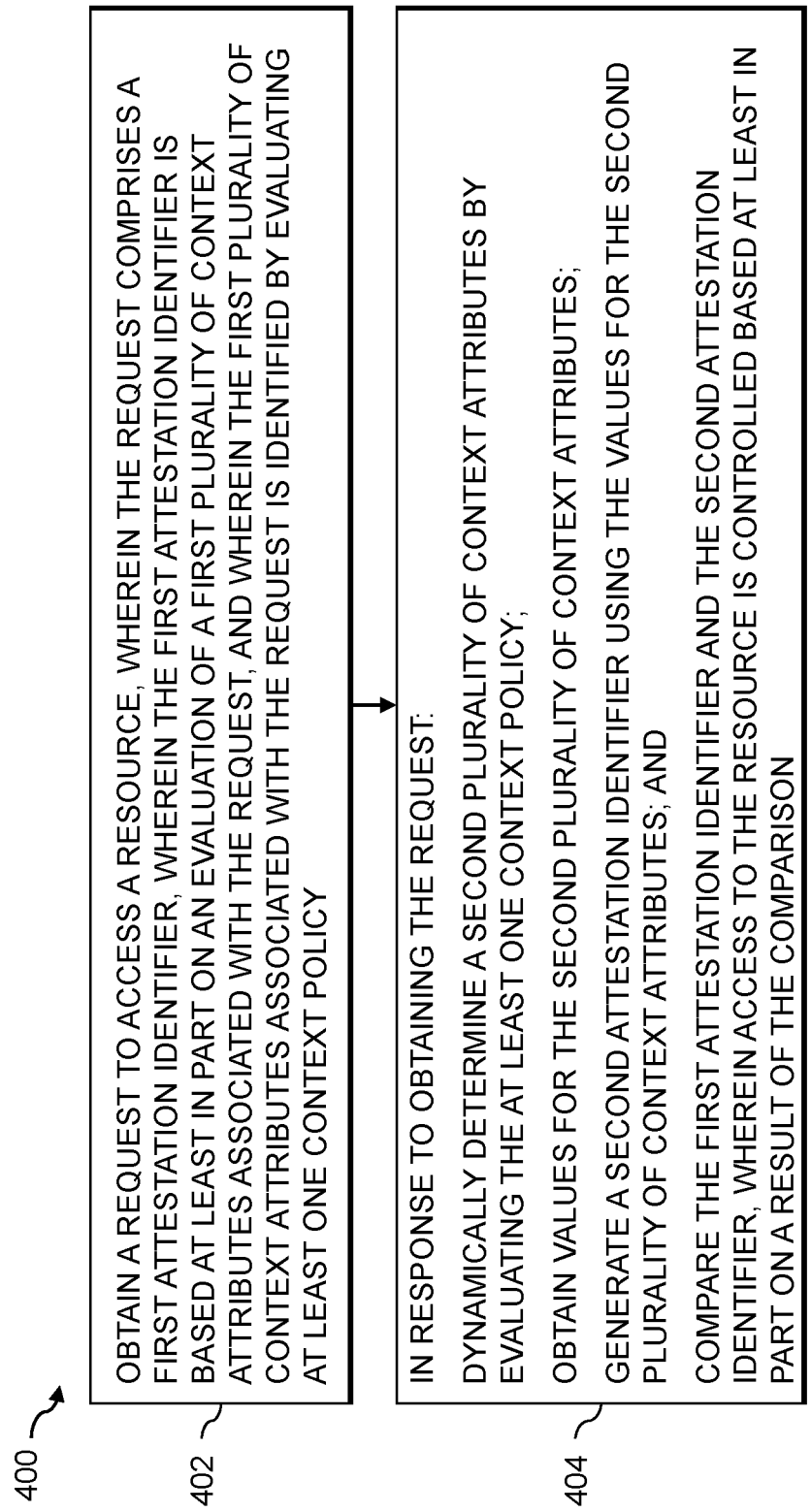
FIG. 4 is a flow chart illustrating an exemplary implementation of a process for access control using policy-based dynamic context evaluation in an illustrative embodiment.

FIG. 4 is a flow chart illustrating an exemplary implementation of a process 400 for access control using policy-based dynamic context evaluation in an illustrative embodiment. The process 400 may be performed, for example, by the context enforcement server 120 of FIG. 1. In the example of FIG. 4, the process 400 obtains, in step 402, a request to access a resource, wherein the request comprises a first attestID, wherein the first attestID is based at least in part on an evaluation of a first plurality of context attributes associated with the request, and wherein the first plurality of context attributes associated with the request is identified by evaluating at least one context policy.

In response to the obtaining the request, in step 404, the process 400 dynamically determines a second plurality of context attributes (e.g., for evaluating the first attestID) by evaluating the at least one context policy; obtains values for the second plurality of context attributes; generates a second attestID using the values for the second plurality of context attributes; and compares the first attestID and the second attestID, wherein access to the resource is controlled (e.g., granted or denied) based at least in part on a result of the comparison.

In some embodiments, the first attestID is generated by at least one processing device of a context attestor. Prior to the obtaining the request, the at least one processing device of the context attestor may evaluate the at least one context policy to identify the first plurality of context attributes and evaluates the first plurality of context attributes to generate the first attestID.

In at least one embodiment, the steps performed in response to the obtaining the request are performed by at least one processing device of a context enforcer. The at least one processing device of the context enforcer may be mutually authenticated with an entity that generated the first attestID.

In one or more embodiments, at least one of the first plurality of context attributes and the second plurality of context attributes comprise two or more of at least one characteristic of an executable file of a requester seeking to access the resource, an identifier of at least one device associated with the requester, a size of one or more files of the requester, an identifier of one or more virtual resource templates associated with the requester, a configuration of one or more virtual resource templates associated with the requester, an identifier of at least one process of the requester, a version identifier of one or more processes of the requester, a geographic location of the requester, and one or more network addresses of the requester.

In some embodiments, one or more of a creation time stamp, an expiration time stamp and a cryptographic signature obtained from the first attestation identifier are verified.

The particular processing operations and other network functionality described in conjunction with FIGS. 2 through 4, for example, are presented by way of illustrative example only, and should not be construed as limiting the scope of the disclosure in any way. Alternative embodiments can use other types of processing operations for access control using policy-based dynamic context evaluation. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for access control using policy-based dynamic context evaluation can be employed, for example, to improve the security of resources, such as protected resource 102, reduce the risk of data breaches and other improper resource accesses, and ensure that the protected resources are accessed only by authorized entities. The disclosed context-based access control techniques provide an additional layer of security and ensure that information and other resources are protected against hijacking or corruption, for example.

One or more embodiments of the disclosure provide improved methods, apparatus and computer program products for access control using policy-based dynamic context evaluation. The foregoing applications and associated embodiments should be considered as illustrative only, and numerous other embodiments can be configured using the techniques disclosed herein, in a wide variety of different applications.

It should also be understood that the disclosed context-based access control techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for access control using policy-based dynamic context evaluation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based context-based access control engine, or portions thereof, are illustratively implemented for use by tenants of such a multi-tenant environment.

Cloud infrastructure as disclosed herein can include cloud-based systems. Virtual machines provided in such systems can be used to implement at least portions of a cloud-based context-based access control platform in illustrative embodiments. The cloud-based systems can include object stores.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
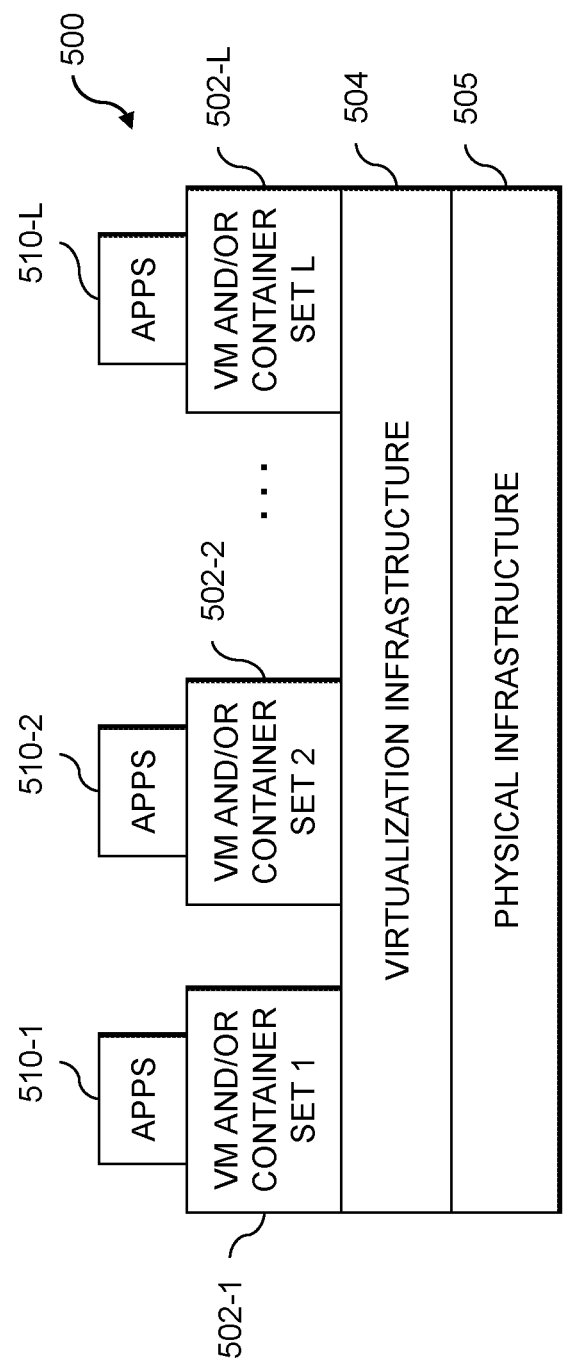
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2 . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2 . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide context-based access control functionality of the type described above for one or more processes running on a given one of the VMs. For example, each of the VMs can implement control logic for context-based access control and associated context examination functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide context-based access control and mitigation functionality of the type described above for one or more processes running on different ones of the containers. For example, a container host device supporting multiple containers of one or more container sets can implement one or more instances of control logic for context-based access control and associated context examination functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a WAN, a LAN, a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an ASIC, an FPGA or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
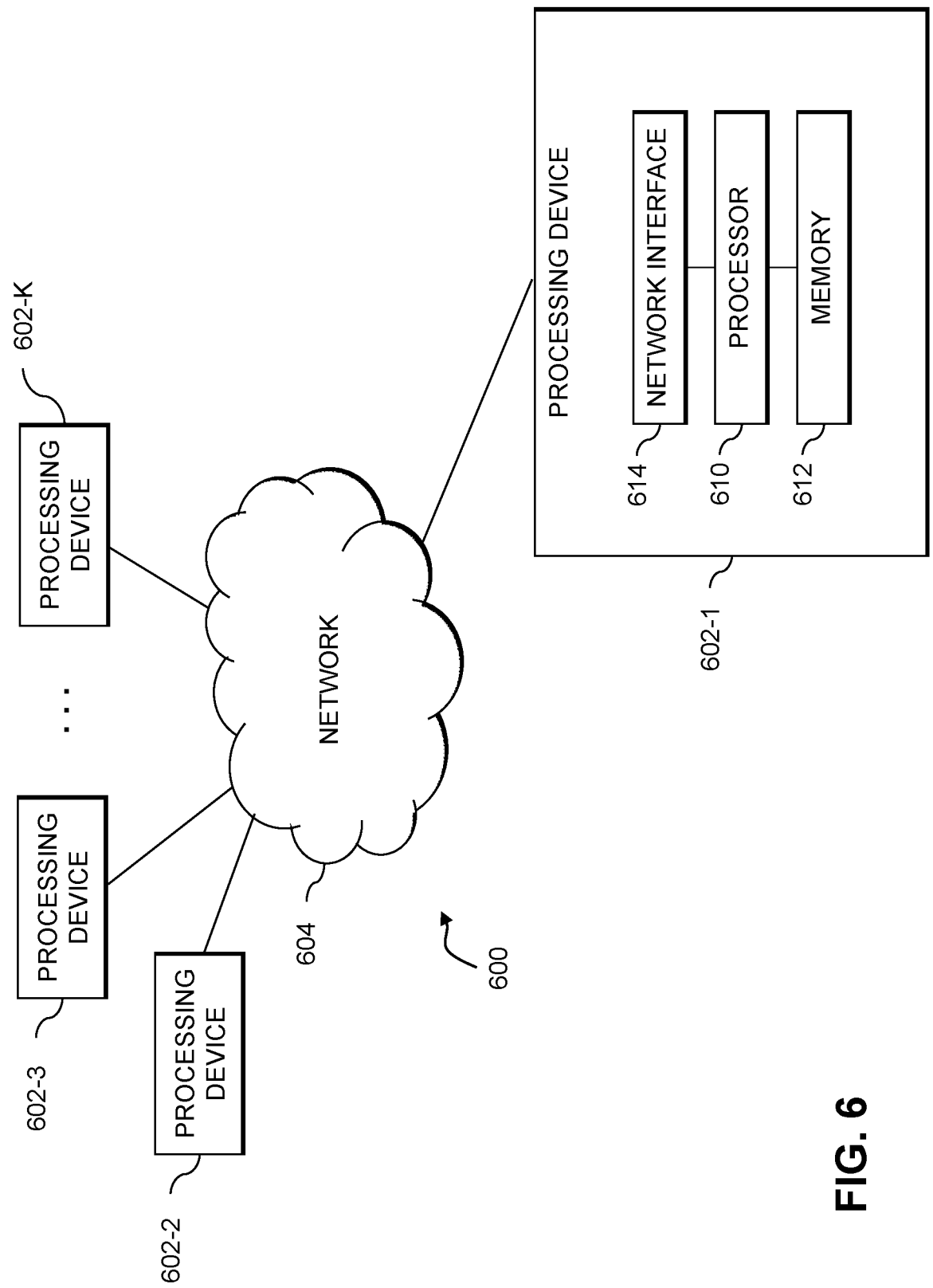
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining a request to access a resource, wherein the request comprises a first attestation identifier, wherein the first attestation identifier is based at least in part on an evaluation of a first plurality of context attributes associated with the request, and wherein the first plurality of context attributes associated with the request is identified by evaluating at least one context policy; and performing the following steps, in response to the obtaining the request:

dynamically determining a second plurality of context attributes by evaluating the at least one context policy, wherein at least one of (i) the first plurality of context attributes and (ii) the second plurality of context attributes comprise two or more of: at least one characteristic of an executable file of a requester seeking to access the resource, an identifier of at least one device associated with the requester, a size of one or more files of the requester, an identifier of one or more virtual resource templates associated with the requester, a configuration of one or more virtual resource templates associated with the requester, an identifier of at least one process of the requester, a version identifier of one or more processes of the requester, a geographic location of the requester, and one or more network addresses of the requester;

obtaining values for the second plurality of context attributes;

generating a second attestation identifier using the values for the second plurality of context attributes; and comparing the first attestation identifier and the second attestation identifier, wherein access to the resource is controlled based at least in part on a result of the comparison;

wherein the method is performed by at least one processing device comprising a processor coupled to a memory.

2. The method of claim 1, wherein the first attestation identifier is generated by at least one processing device of a context attestor.

3. The method of claim 2, wherein, prior to the obtaining the request, the at least one processing device of the context attestor evaluates the at least one context policy to identify the first plurality of context attributes and evaluates the first plurality of context attributes to generate the first attestation identifier.

4. The method of claim 1, wherein the steps performed in response to the obtaining the request are performed by at least one processing device of a context enforcer.

5. The method of claim 4, wherein the at least one processing device of the context enforcer is mutually authenticated with an entity that generated the first attestation identifier.

6. The method of claim 1, further comprising verifying one or more of a creation time stamp, an expiration time stamp and a cryptographic signature obtained from the first attestation identifier.

7. The method of claim 1, wherein the first attestation identifier is generated prior to the obtaining the request to access the resource and wherein the second attestation identifier is generated subsequent to the obtaining the request to access the resource.

8. An apparatus comprising:
at least one processing device comprising a processor coupled to a memory;
the at least one processing device being configured to implement the following steps:
obtaining a request to access a resource, wherein the request comprises a first attestation identifier, wherein the first attestation identifier is based at least in part on an evaluation of a first plurality of context attributes associated with the request, and wherein the first plurality of context attributes associated with the request is identified by evaluating at least one context policy; and
in response to the obtaining the request:
dynamically determining a second plurality of context attributes by evaluating the at least one context policy, wherein at least one of (i) the first plurality of context attributes and (ii) the second plurality of context attributes comprise two or more of: at least one characteristic of an executable file of a requester seeking to access the resource, an identifier of at least one device associated with the requester, a size of one or more files of the requester, an identifier of one or more virtual resource templates associated with the requester, a configuration of one or more virtual resource templates associated with the requester, an identifier of at least one process of the requester, a version identifier of one or more processes of the requester, a geographic location of the requester, and one or more network addresses of the requester;
obtaining values for the second plurality of context attributes;
generating a second attestation identifier using the values for the second plurality of context attributes; and
comparing the first attestation identifier and the second attestation identifier, wherein access to the resource is controlled based at least in part on a result of the comparison.

9. The apparatus of claim 8, wherein the first attestation identifier is generated by at least one processing device of a context attestor.

10. The apparatus of claim 9, wherein, prior to the obtaining the request, the at least one processing device of the context attestor evaluates the at least one context policy to identify the first plurality of context attributes and evaluates the first plurality of context attributes to generate the first attestation identifier.

11. The apparatus of claim 8, wherein the steps performed in response to the obtaining the request are performed by at least one processing device of a context enforcer.

12. The apparatus of claim 11, wherein the at least one processing device of the context enforcer is mutually authenticated with an entity that generated the first attestation identifier.

13. The apparatus of claim 8, further comprising verifying one or more of a creation time stamp, an expiration time stamp and a cryptographic signature obtained from the first attestation identifier.

14. The apparatus of claim 8, wherein the first attestation identifier is generated prior to the obtaining the request to access the resource and wherein the second attestation identifier is generated subsequent to the obtaining the request to access the resource.

15. A non-transitory processor-readable storage medium having stored therein program code of one or more software programs, wherein the program code when executed by at least one processing device causes the at least one processing device to perform the following steps:
obtaining a request to access a resource, wherein the request comprises a first attestation identifier, wherein the first attestation identifier is based at least in part on an evaluation of a first plurality of context attributes associated with the request, and wherein the first plurality of context attributes associated with the request is identified by evaluating at least one context policy; and
in response to the obtaining the request:
dynamically determining a second plurality of context attributes by evaluating the at least one context policy, wherein at least one of (i) the first plurality of context attributes and (ii) the second plurality of context attributes comprise two or more of: at least one characteristic of an executable file of a requester seeking to access the resource, an identifier of at least one device associated with the requester, a size of one or more files of the requester, an identifier of one or more virtual resource templates associated with the requester, a configuration of one or more virtual resource templates associated with the requester, an identifier of at least one process of the requester, a version identifier of one or more processes of the requester, a geographic location of the requester, and one or more network addresses of the requester;
obtaining values for the second plurality of context attributes;
generating a second attestation identifier using the values for the second plurality of context attributes; and
comparing the first attestation identifier and the second attestation identifier, wherein access to the resource is controlled based at least in part on a result of the comparison.

16. The non-transitory processor-readable storage medium of claim 15, wherein the first attestation identifier is generated by at least one processing device of a context attestor.

17. The non-transitory processor-readable storage medium of claim 16, wherein, prior to the obtaining the request, the at least one processing device of the context attestor evaluates the at least one context policy to identify the first plurality of context attributes and evaluates the first plurality of context attributes to generate the first attestation identifier.

18. The non-transitory processor-readable storage medium of claim 15, wherein the steps performed in response to the obtaining the request are performed by at least one processing device of a context enforcer.

19. The non-transitory processor-readable storage medium of claim 18, wherein the at least one processing device of the context enforcer is mutually authenticated with an entity that generated the first attestation identifier.

20. The non-transitory processor-readable storage medium of claim 15, further comprising verifying one or more of a creation time stamp, an expiration time stamp and a cryptographic signature obtained from the first attestation identifier.

* * * * *